US010494946B2

(12) United States Patent
Albers et al.

(10) Patent No.: US 10,494,946 B2
(45) Date of Patent: Dec. 3, 2019

(54) METHOD OF MAKING A TURBINE SHROUD

(71) Applicant: General Electric Company, Schenectady, NY (US)

(72) Inventors: Joseph C. Albers, Ft. Wright, KY (US); Monty Lee Shelton, Loveland, OH (US); Robert Proctor, West Chester, OH (US); Richard Russo, Windham, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/222,328

(22) Filed: Jul. 28, 2016

(65) Prior Publication Data

US 2016/0333719 A1 Nov. 17, 2016

Related U.S. Application Data

(62) Division of application No. 13/827,762, filed on Mar. 14, 2013, now abandoned.

(51) Int. Cl.
| | |
|---|---|
| *F01D 11/12* | (2006.01) |
| *F01D 11/00* | (2006.01) |
| *F01D 25/24* | (2006.01) |
| *F02C 7/28* | (2006.01) |

(52) U.S. Cl.
CPC .......... *F01D 11/122* (2013.01); *F01D 11/005* (2013.01); *F01D 11/127* (2013.01); *F01D 25/246* (2013.01); *F02C 7/28* (2013.01); *F05D 2220/32* (2013.01); *F05D 2240/11* (2013.01); *F05D 2240/57* (2013.01); *Y02T 50/671* (2013.01)

(58) Field of Classification Search
CPC .... F01D 11/122; F01D 11/127; F01D 11/005; F01D 25/246; F02C 7/28; F05D 2220/32; F05D 2240/11; F05D 2240/57
See application file for complete search history.

(56) References Cited

U.S. PATENT DOCUMENTS

| | | | |
|---|---|---|---|
| 4,512,712 | A | 4/1985 | Baran |
| 4,669,955 | A | 6/1987 | Pellow |
| 4,863,345 | A | 9/1989 | Thompson et al. |
| 5,188,507 | A | 2/1993 | Sweeney |

(Continued)

OTHER PUBLICATIONS

Unofficial English Translation of Chinese Office Action issued in connection with corresponding CN Application No. 01380060905.1 dated Oct. 28, 2015.

*Primary Examiner* — Moshe Wilensky
(74) *Attorney, Agent, or Firm* — General Electric; James Reed

(57) ABSTRACT

A method of making a shroud assembly by: forming a shroud frame consisting of a one-piece hook and rail assembly which includes a first rail and a second rail disposed at lateral edges and a first support and a second support connected to the first rail and the second rail, the first and second rails and the first and second supports being integrally joined to one another and defining a central aperture therebetween; joining a metallic backsheet to the shroud frame covering the central aperture; and attaching a honeycomb rubs strip to the metallic backsheet via an upper edge of the honeycomb seal structure.

10 Claims, 6 Drawing Sheets

(56) References Cited

U.S. PATENT DOCUMENTS

| | | |
|---|---|---|
| 5,192,185 A | 3/1993 | Leonard |
| 5,232,340 A | 8/1993 | Morgan |
| 5,423,659 A * | 6/1995 | Thompson ............ F01D 25/246 415/139 |
| 5,738,490 A | 4/1998 | Pizzi |
| 5,924,942 A | 7/1999 | Stahl et al. |
| 6,062,813 A | 5/2000 | Halliwell et al. |
| 6,340,285 B1 | 1/2002 | Gonyou et al. |
| 6,341,938 B1 | 1/2002 | Zegarski et al. |
| 6,468,026 B1 | 10/2002 | Bonnoitt et al. |
| 6,814,538 B2 | 11/2004 | Thompson |
| 6,902,371 B2 | 6/2005 | Anderson et al. |
| 7,147,429 B2 | 12/2006 | Czachor et al. |
| 7,377,742 B2 | 5/2008 | Shapiro et al. |
| 7,527,477 B2 | 5/2009 | Norton et al. |
| 8,740,552 B2 | 6/2014 | Marusko et al. |
| 8,753,073 B2 | 6/2014 | Albers et al. |
| 9,238,977 B2 | 1/2016 | Albers et al. |
| 2005/0002779 A1 | 1/2005 | Tanaka |
| 2005/0002780 A1 | 1/2005 | Tanaka |
| 2005/0004810 A1* | 1/2005 | Tanaka ...................... F01D 9/04 415/173.1 |
| 2007/0059178 A1* | 3/2007 | Shapiro ................... F01D 11/08 416/181 |
| 2007/0231132 A1 | 10/2007 | Durand et al. |
| 2009/0269188 A1 | 10/2009 | Martin |
| 2010/0247298 A1 | 9/2010 | Nakamura et al. |

\* cited by examiner

METHOD OF MAKING A TURBINE SHROUD

CROSS-REFERENCE TO RELATED APPLICATION

This application is a divisional of U.S. Ser. No. 13/827,762, filed on Mar. 14, 2013, the entire disclosure of which is incorporated herein by reference.

BACKGROUND

Present embodiments relate generally to a gas turbine engine. More specifically, the present embodiments relate, but are not limited to, reducing leakage at a in a low pressure turbine section of a gas turbine engine.

A typical gas turbine engine generally possesses a forward end and an aft end with its several core or propulsion components positioned axially therebetween. An air inlet or intake is located at a forward end of the engine. Moving toward the aft end, in order, the intake is followed by a fan, a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list.

The compressor and turbine generally include rows of airfoils that are stacked axially in stages. Each stage includes a row of circumferentially spaced stator vanes and a row of rotor blades which rotate about a center shaft or axis of the turbine engine. A multi-stage low pressure turbine follows the multi-stage high pressure turbine and is typically joined by a second shaft to a fan disposed upstream from the compressor in a typical turbo fan aircraft engine configuration for powering an aircraft in flight.

The stator is formed by a plurality of nozzle segments which are abutted at circumferential ends to form a complete ring about the axis of the gas turbine engine. Each nozzle segment may comprise a single vane, commonly referred to as a singlet. Alternatively, a nozzle segment may have two vanes per segment, which are generally referred to as doublets. In a third embodiment, additional numbers of vanes may be disposed on a single segment. In these embodiments, the vanes extend between an inner band and an outer band.

A typical gas turbine engine utilizes a high pressure turbine and low pressure turbine to maximize extraction of energy from high temperature combustion gas. The turbine section typically has an internal shaft axially disposed along a center longitudinal axis of the engine. The blades are circumferentially distributed on a rotor causing rotation of the internal shaft. The internal shaft is connected to the rotor and the air compressor, such that the turbine provides a rotational input to the air compressor to drive the compressor blades. This powers the compressor during operation and subsequently drives the turbine. As the combustion gas flows downstream through the turbine stages, energy is extracted therefrom and the pressure of the combustion gas is reduced.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. The stator nozzles turn the hot combustion gas in a manner to maximize extraction at the adjacent downstream turbine blades. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

During such operation of the gas turbine engine, it is desirable to minimize thermally induced deformation of the outer casing through the turbine section of the engine. This is accomplished, according to some embodiments, by isolating the outer casing from heat produced by the hot combustion gases flowing through the turbine. Turbine shrouds are connected to the engine casing to provide an outer boundary flow for the combustion gas limiting high temperature combustion gas from adversely affecting the casing. The shroud extends circumferentially to form a ring shape and may be formed of a plurality of circumferentially extending shroud segments. However, as combustion gas moves radially outward with rotation of the turbine blades, the combustion gas can pass through axial seams between the adjacent shroud segments. This is not optimal and results in energy losses.

It would be desirable to overcome these and other deficiencies with turbine sections of gas turbine engines. More specifically it would be desirable to provide a restriction in at least a radial direction to flow of combustion gas between shroud segments.

SUMMARY

According to some embodiments, disclosed herein is a method of making a shroud assembly by: forming a shroud frame consisting of a one-piece hook and rail assembly which includes a first rail and a second rail disposed at lateral edges and a first support and a second support connected to the first rail and the second rail, the first and second rails and the first and second supports being integrally joined to one another and defining a central aperture therebetween; joining a metallic backsheet to the shroud frame covering the central aperture; and attaching a honeycomb rubs strip to the metallic backsheet via an upper edge of the honeycomb seal structure.

All of the above outlined features are to be understood as exemplary only and many more features and objectives of the turbine shroud with spline seal may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of these exemplary embodiments, and the manner of attaining them, will become more apparent and the turbine shroud with spline seal feature will be better understood by reference to the following description of embodiments taken in conjunction with the accompanying drawings, wherein.

DETAILED DESCRIPTION

Figure 1:
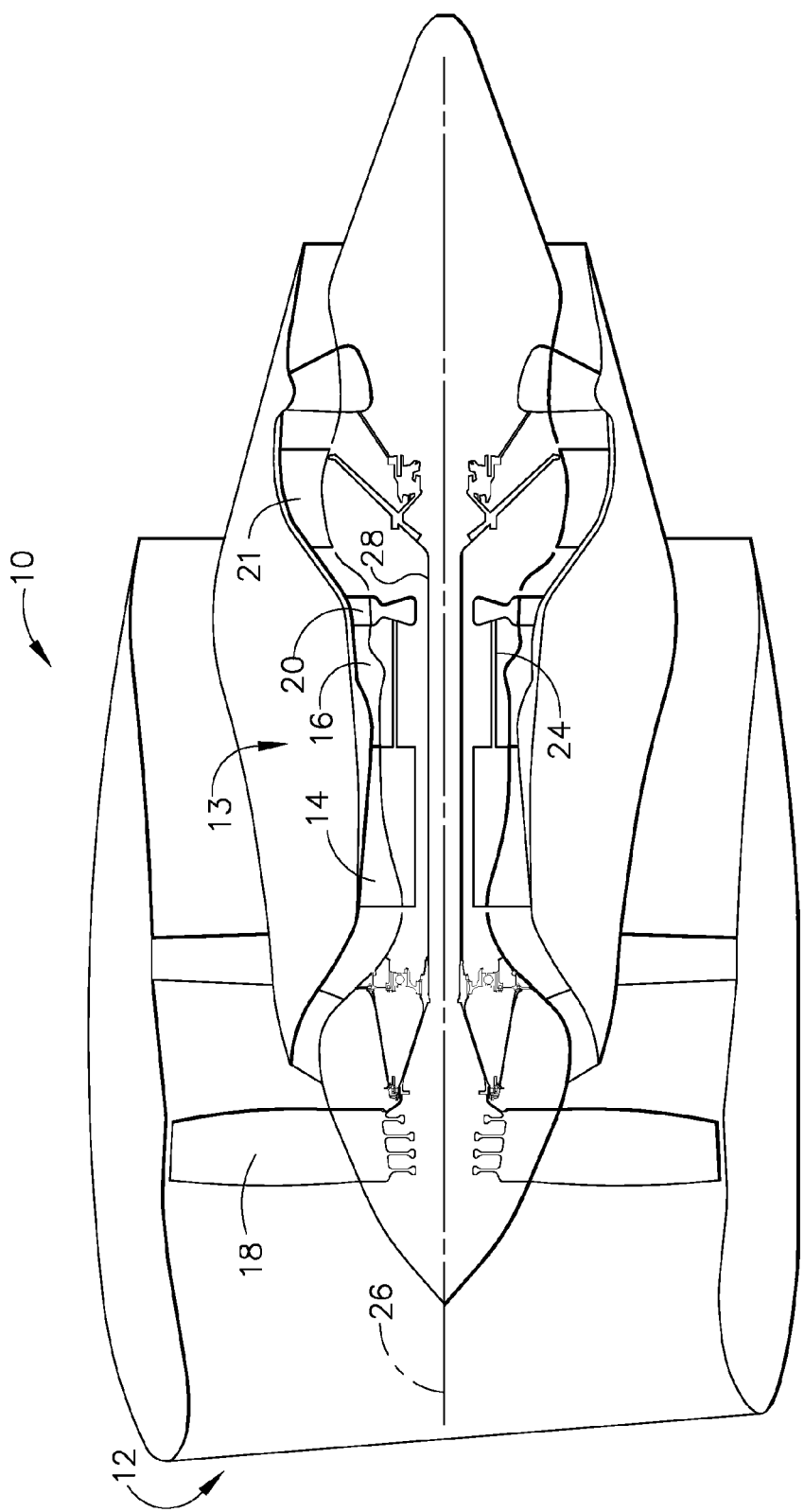
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-6, various embodiments of a gas turbine engine are depicted having a turbine shroud with spline seal. The shroud includes a spline for locating a spline seal between an adjacent spline. The shroud may also have a back sheet extending in an aft direction to limit leakage aft of the shroud. In addition to limiting weight, it is desirable to reduce weight.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Referring initially to FIG. 1, a schematic side section view of a gas turbine engine 10 is shown. The function of the gas turbine engine is to extract energy from high pressure and temperature combustion gases and convert the energy into mechanical energy for work. The gas turbine engine 10 has an engine inlet end 12 wherein air enters the core or propulsor 13 which is defined generally by a compressor 14, a combustor 16 and a multi-stage high pressure turbine 20. Collectively, the propulsor 13 provides thrust or power during operation. The gas turbine 10 may be used for aviation, power generation, industrial, marine or the like.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages.

Figure 2:
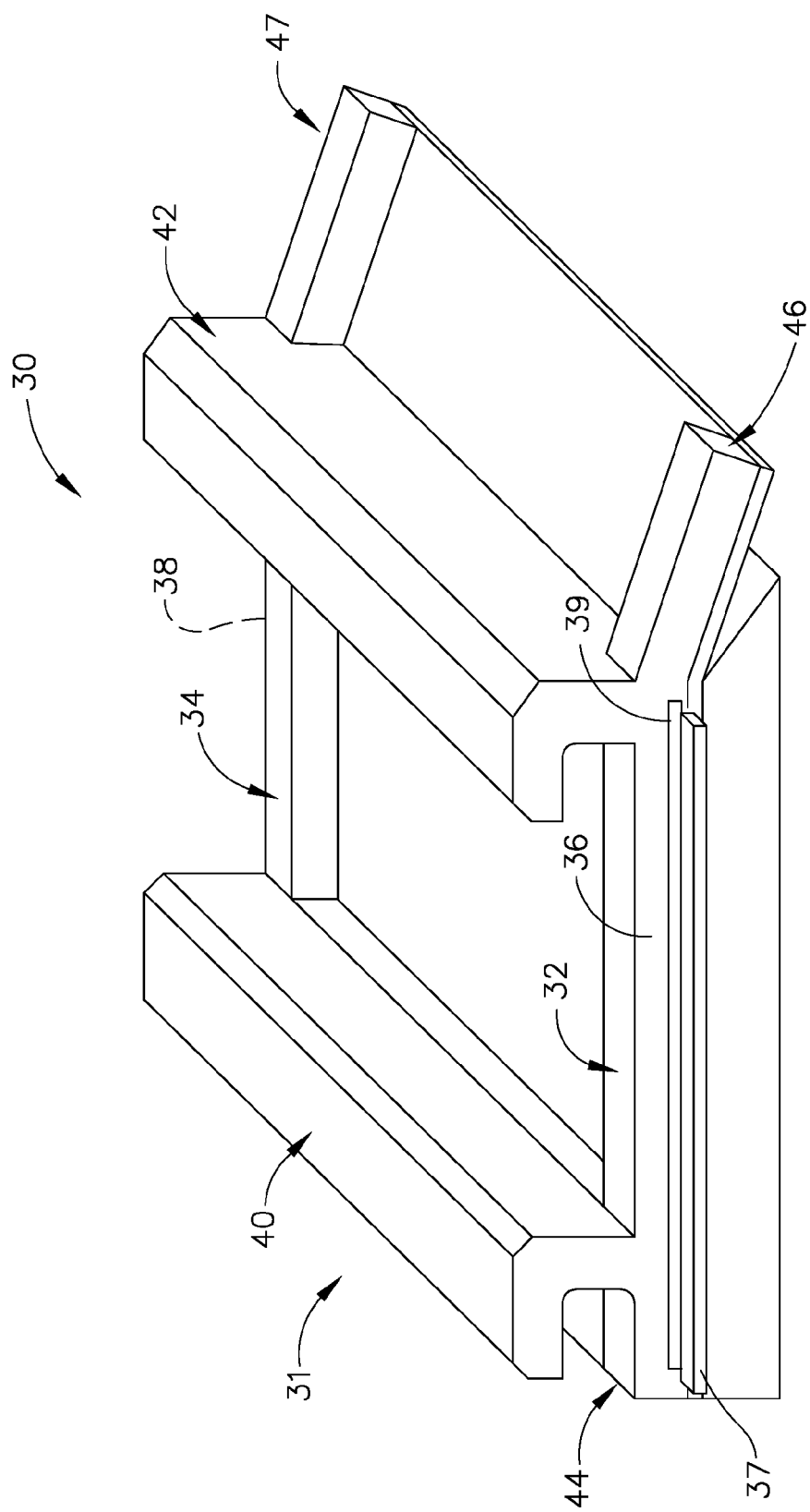
FIG. 2 is an isometric view of a shroud assembly segment of instant embodiments.

Referring now to FIG. 2, an isometric view of a shroud assembly segment 30 is depicted. Instant embodiments of the shroud segment assembly 30 are located in the low pressure turbine 21 area of the engine 10 (FIG. 1). The instant segment assembly 30 embodiment is a one-piece cast hook and rail assembly. The embodiment utilizes a frame 31 comprising a first rail 32 and a second rail 34 which extend in a generally axial direction parallel to the gas turbine engine axis 26 (FIG. 1) or alternatively may be at an acute angle relative to the axis 26. Extending laterally or in the circumferential direction between the first and second rails 32, 34 the frame 31 further comprises a first or forward support 40 and a second or aft support 42. The shroud assembly segment 30 includes forward tips 44 and may include aft tips 46, 47 extending from the aft support 42. As described further, the rails 32, 34 may be formed of various cross-sections and may be of various materials. Similarly, the supports 40, 42 may have various shapes and may be formed of various materials and formed by a variety of manufacturing processes.

The rails 32, 34 include a slot or spline 39 disposed on circumferential ends or slash face surfaces 36, 38. The splines 39 extend along the surfaces 36, 38 to receive a spline seal 37. The spline seal 37 is positioned at one circumferential end to a first segment 30 and at a second circumferential end to a circumferentially adjacent segment (not shown). As turbine blades move radially beneath, the combustion gas moves both radially and axially. The spline seal 37 precludes combustion gas moving within the turbine from passing in a radial direction between segments 30 defining the shroud.

Figure 3:
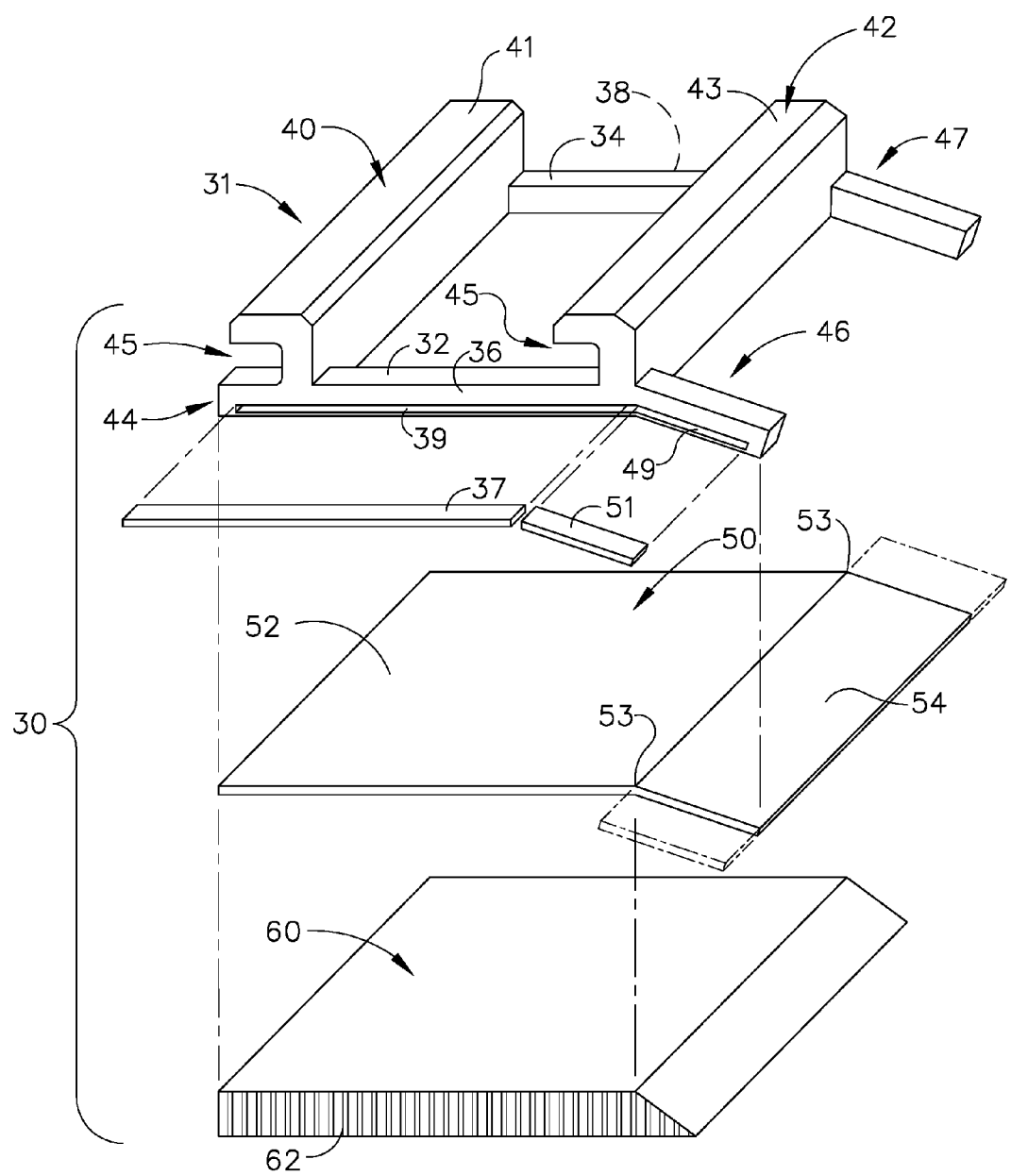
FIG. 3 is an exploded assembly view of the shroud assembly segment of FIG. 2.

Referring now to FIG. 3, an exploded assembly view of the shroud assembly segment 30 is depicted in isometric view. First, the shroud frame 31 includes a cast structure having the rails 32, 34 integrally joined to supports 40, 42. According to alternative embodiments, the frame 31 may be forged, cast, direct metal laser sintered or as a further alternative may be formed of metallic plate or bar material. The rails 32, 34 may alternatively be formed of back sheet stock or other materials and of various cross-sectional shapes.

The supports 40, 42 may take various shapes described further herein. According to the instant embodiment, the supports 40, 42 are hook-shaped which may include various cross-sections. For example, the depicted supports 40, 42 are generally inverted L-shaped structures extending vertically from, and between, the rails 32, 34. According to the instant embodiment, the supports 40, 42 are integrally formed with the rails 32, 34. As previously described, the rails 32, 34 have tips 44 at forward ends for aiding connection with an engine casing. A gap 45 is defined between the upper axial legs 41, 43 of the support 40, 42 and the rail tips 44. In the instant embodiment, a similar gap is also defined between the upper leg of the aft support 42 and the rails 32, 34. The gaps 45 receive a flange of the engine casing for mounting of the shroud assembly segment 30. It should be understood by one skilled in the art that the supports 40, 42 are not limited to the L-shape shown but alternatively may be Z-shaped, C-shaped, straight or other shapes allowing the structure to be retained by the engine casing. Additionally, the supports 40, 42 and/or lower rail surfaces may be curved to approximate the curvature of the engine casing.

The splines 39 are also positioned in the lateral or circumferentially outer faces 36, 38 of the rails 32, 34. Each spline 39 allows for receiving a spline seal 37 to engage with an adjacent assembly segment 30. The spline seal 37 inhibits radial leakage of air between the segments 30. More specifically, since the segments 30 are circumferentially adjacent to one another, axial seams are formed between adjacent shroud assembly segments 30. The spline seal 37 limits combustion gas from leaking through such seams.

As depicted in broken line, the exemplary spline seal 37 is rectangular in shape, but may form a variety of shapes. For example, the seal structure 37 may be circular, square, rectangular, other polygons or geometries. The seal 37 may be formed of a singular material or may be a multi-material structure. The seal 37 may change shape at operating temperature as well. The seal 37 has a volumetric thermal expansion coefficient which is a thermodynamic property of the material. For example, the volumetric thermal expansion can be expressed as $\alpha_V=(1/v)(\Delta V/\Delta T)$, where $\alpha_V$ is the volumetric thermal expansion coefficient, V is the volume of the material and $\Delta V/\Delta T$ with respect to the change in volume of the material with respect to the change in temperature of the material. Thus the volumetric thermal expansion coefficient measures the fractional change in volume per degree change in temperature at a constant temperature.

When viewed in a forward looking aft direction, the adjacent shroud assembly segments 30 are positioned in their annular arrangement, the seals 37 are positioned in each adjacent spline 39 to block an air flow path which would otherwise allow flow between adjacent assembly segments 30.

Extending across the bottom surfaces of the rails 32, 34 is a backsheet 50 which may be, for example, metallic or various materials. The shield 50 is designed to extend in aft and circumferential directions of the shroud frame 31 so as to define a flow path along a radially inner side of the shroud frame 31. The backsheet 50 is sized to extend circumferentially between lateral ends of the rails 32, 34 to the opposite circumferential end of rail 34. The shield 50 also extends, in some embodiments, in an axial direction from forward end of the rails 32, 34 to aft ends of the rails 32, 34. As depicted in the embodiment, the backsheet 50 may have a thickness which is less than prior art backsheet structures since the cast rails 32, 34 provide additional strength. The instant embodiment depicts the back sheet or shield 50 being of a constant thickness. However, according to some embodiments, the back sheet 50 may be formed of variable thickness. For example, areas which may be expected to receive impact from a detached rotor blade may have an increased thickness to dissipate energy of such ejected blade while areas adjacent the rails 32, 34 or supports 40, 42 are of thinner dimension radially. Similarly, while thicknesses of the rails 32, 34 are generally shown as constant, alternative embodiments may utilize rails of varying thickness.

In addition to the first portion 52 of the sheet 50, described above, the backsheet 50 may also include a second portion 54. The second portion 54 of the shield 50 extends from an aft edge 53 of the first portion 52. The first and second portions 52, 54 may be formed of a single sheet of metal as shown in the depicted view and bent or alternatively, may be joined from two separate pieces such as by welding or brazing. In a third alternative, the two pieces may be abutted against one another but not joined to one another. Instead, the first portion 52 may be joined with the frame 31 and the second portion 54 also joined with the frame 31 but the first and second portions 52, 54 closely abutting one another.

The frame 31 includes aft tips 46, 47 extend from the aft side of support 42 and are formed at an angle to the rails 32, 34. The angle of the tips 46, 47 approximate the angle of the second portion 54 relative to the first portion 52 of metallic sheet shield 50. These tips 46, 47 may be formed integrally with the frame 31 or may be joined in a separate manufacturing step to extend from the frame 31, for example welding or brazing.

According to one embodiment, the tips 46, 47 may also include splines 49 within circumferential end surfaces of these structures. This allows for the additional spline seal 51 to be utilized in this area of the frame 31 inhibiting radial leakage between adjacent shroud assembly segments 30. In an embodiment utilizing the spline 49, the spline 49 may be formed continuously with spline 39 so that a single spline seal may be utilized. Alternatively, the spline 49 may be formed separately from but closely abut spline 39 and minimize any gap between these spline seal elements. In a further alternative, the spline 49 may be welded or brazed to spline 39 or may closely abut spline 39.

In still a further alternative, the second backsheet portions 54 may be widened in the circumferential direction so as to overlap second portions 54 of an adjacent backsheet 50. This is shown in the embodiment as the optional back sheet portion in broken lines. This may eliminate the need or desire to have the spline seal 49 located in these tips 46, 47. Thus in either embodiment, leakage aft of the second support 42 is limited.

Referring still to FIG. 3, a honeycomb rub strip 60 is positioned beneath the sheet shield 50. The honeycomb structure 60 is joined for example, mechanically, bonded, welded or brazed, directly to the back sheet 50 and is sized to extend circumferentially between the rails 32, 34 and axially from the tips 44 to the aft support 42. The aft end of the honeycomb 60 may be cut on an angle to approximate the angle of the second portion 54 of the metallic back sheet 50 if such is utilized. The honeycomb rub strip 60 may take any of various conventional forms. The rub strip 60 may have a thickness in a radial direction so that it is radially inner surface spaced from a turbine tip to provide a minimal clearance gap therebetween. The honeycomb rub strip 60 may further include an abradable radially inner surface and define an outer boundary for the passage of hot combustion gas through the turbine section of the engine 10 (FIG. 1). Additionally, the radially outward ends of the turbine blades 23 (FIG. 5) may include sealing fins 25 (FIG. 5) abutting the abradable surface 62 of the honeycomb rub strip 60. The honeycomb rub strip 60 may be deformed by these sealing fins during rotation of the rotor blades 23 such that a nearly zero tolerance fit is defined between the honeycomb lower surface 62 and the sealing fins 25 of the rotor blades. This reduces the leakage of combustion gas through the turbine section of the engine 10.

Figure 4:
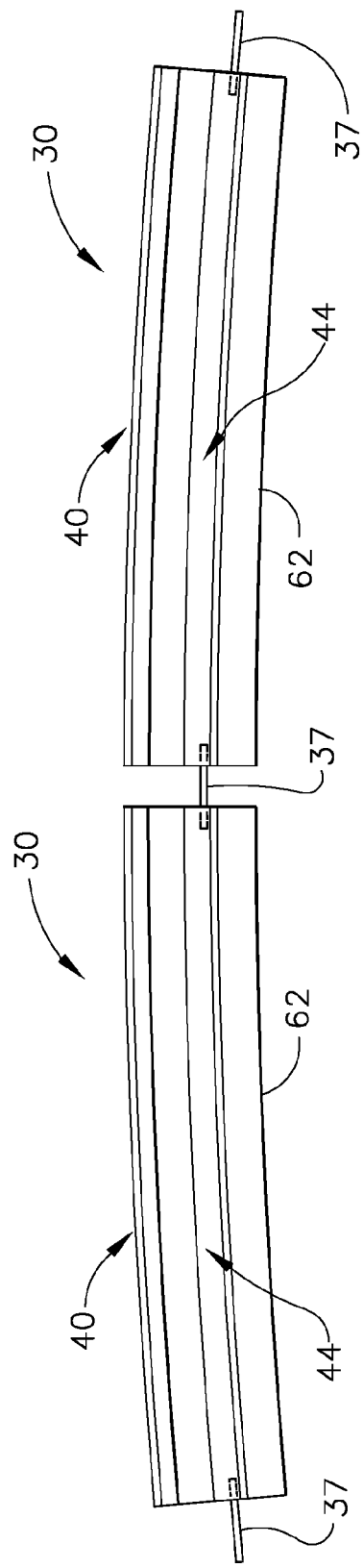
FIG. 4 is a axial view of two shroud assembly segments.

Referring now to FIG. 4, an aft looking forward view of adjacent assembly segments is depicted. Each of the segments is joined by a spline seal 37 at slash face ends. Accordingly, the structure provides a circumferential design which lines the inner surface of the engine case to retain high temperature combustion gas on the lower side, as depicted, of the assembly segments 30 and inhibiting deformation of the engine casing along the outer perimeter of the assembly segments 30. As depicted, the spline seal 37 inhibit high temperature combustion gas from escaping between the axially extending gaps between adjacent assembly segments 30. The gaps in the depicted embodiment are exaggerated for ease of understanding, as one skilled in the art will understand. According to additional embodiments, the backsheets 50 may be extended in the circumferential direction to aid in reducing leakage near the aft end of the assembly segments 30. These sheets 50 may overlap to aid in reducing leakage between the assembly segments 30.

Figure 5:
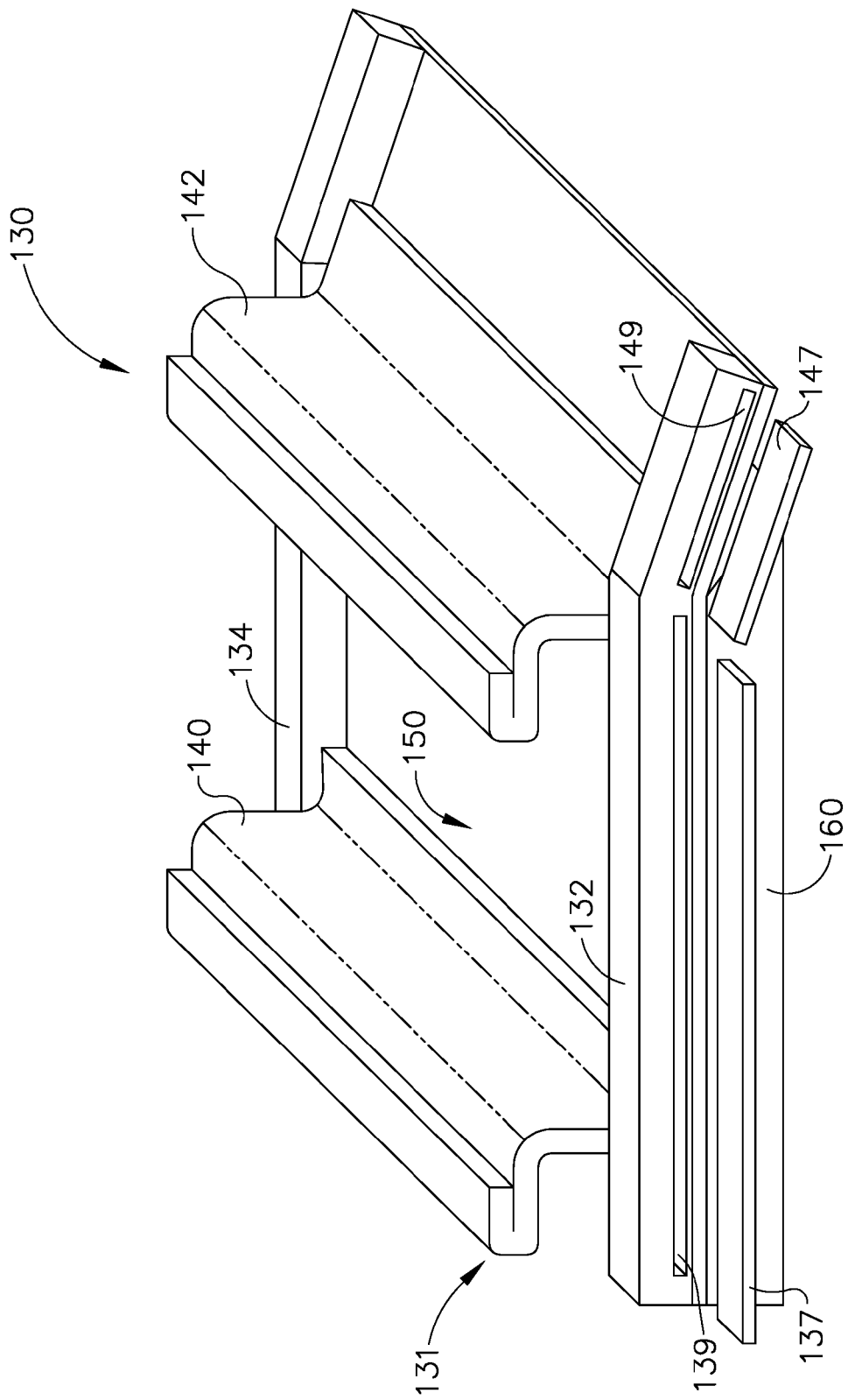
FIG. 5 is an isometric view of an alternate embodiment of a shroud assembly segment.

Referring now to FIG. 5, an alternative embodiment is depicted for an exemplary shroud assembly segment 130. According to this embodiment the frame 131, defined by the rails 132, 134 and supports 140, 142 are not a one-piece structure. Instead, the rails 132, 134 are formed independently from the supports 140, 142. The rails 132, 134 may be formed of cast rails, plate material or forged material in bar sheet stock form and may be formed of various cross-sections. Additionally, in order decrease weight, the supports 140, 142 are formed of sheet metal and are depicted to have an inverted L-shape although other cross sections may be utilized. In the instant embodiment, the sheet metal supports 140, 142 are welded or otherwise bonded to the rails 132, 134. As an alternative, the rails 132, 134 may be formed of thickened sheet metal. In either embodiment, it is preferable that the sheet metal or the cast metal be thick enough to provide for formation of a spline 139 extending in the axial direction of the circumferential end faces of the rails 132, 134. In the previous embodiment, the rails may or may not include a spline which is continuous or discontinuous from spline 149. If a spline 149 is not used, it may be desirable to widen the sheet metal shield 150 so that adjacent sheets overlap aft of the second rail 142 to further limit leakage in these areas.

Figure 6:
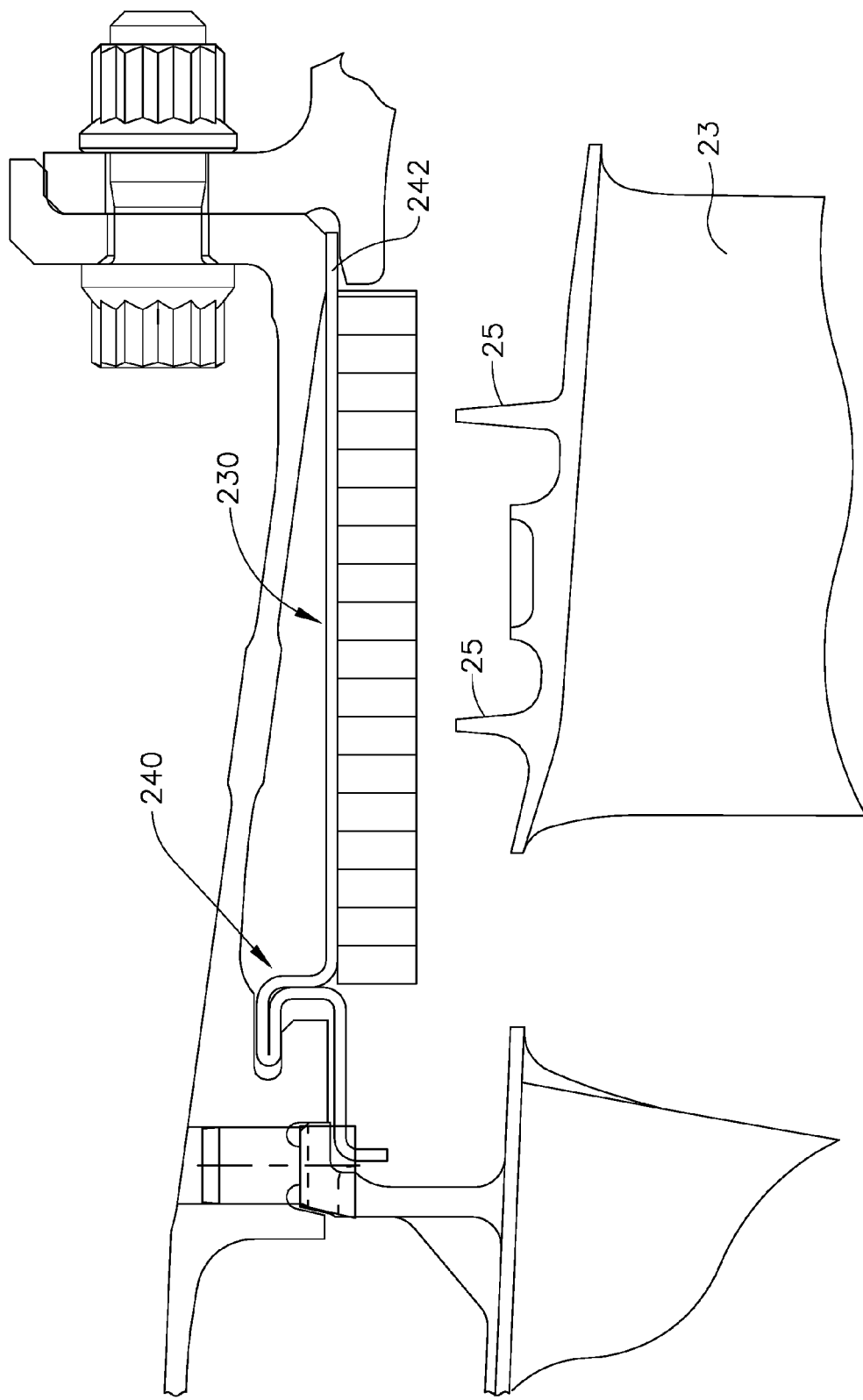
FIG. 6 is a side view of an alternate shroud assembly segment.

Referring now to FIG. 6, a side view of an alternate shroud assembly segment 230 is depicted in an assembled view within a turbine section. The structure depicts views of a forward support 240 and a rear support 242 which is linear defining a shoulder, rather than the inverted L-shape previously described. These structures may be formed of a plurality of materials including but not limited to bar stock, plate stock, cast materials, forged materials and sheet metallics, including alloys. It should be understood from this description as well as the previous descriptions, that various cross sections may be utilized to define the support structures for any of shroud assembly segments.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of making a turbine shroud assembly comprising the steps of:

forming a shroud frame as a one-piece hook and rail assembly which includes a first rail and a second rail disposed at lateral edges and a first L-shaped support and a second L-shaped support connected to the first rail and the second rail, the first and second rails and the first and second L-shaped supports being cast and integrally formed with one another and defining a central aperture therebetween such that the first and second L-shaped supports each have a portion that extends forward;

joining a first portion of a metallic backsheet to the shroud frame covering the central aperture and joining a second portion of a metallic backsheet to the shroud frame such that the second portion of the metallic backsheet extends aft beyond second support such that the second portion of the metallic backsheet is positioned at an angle relative to the first portion of the metallic backsheet; and attaching a honeycomb rub strip to the metallic backsheet via an upper edge of the honeycomb rub strip.

2. The method of claim 1, at least one of the supports being an overhang.

3. The method of claim 1, at least a portion of the backsheet extending circumferentially beyond the first and second rails.

4. The method of claim 1, further comprising the step of forming a spline extending axially in the first rail and the second rail along laterally outer surfaces of the first rail and the second rail.

5. The method of claim 1, further comprising the step of inserting a spline seal having a first edge and a second opposite edge, the first edge disposed in each of the spline grooves and the second opposite edge being capable of positioning in an adjacent shroud assembly.

6. A method of making a turbine shroud assembly, comprising the steps of:

forming a shroud frame as a one-piece hook and rail assembly which includes a first rail and a second rail, the first rail and second rails extending in an axial direction and a first L-shaped support and a second L-shaped support extending between the first rail and the second rail in a circumferential direction, the first and second rails and the first and second supports being cast and formed with one another and defining a central aperture therebetween such that the first and second L-shaped supports each have a portion that extends forward;

joining a backsheet having a first portion and a second portion to a lower surface of the shroud frame such that the first portion is covering the central aperture and the second portion extends aft at an angle to the first portion;

attaching a honeycomb rub strip to a lower surface of the backsheet; and forming a spline along an outer surface of each of the first rail and the second rail.

7. The method of claim 6, the first and second rails extending aft beyond the backsheet.

8. The method of claim 7, the spline extending beyond the second support.

9. A method of making a turbine shroud assembly, comprising the steps of:

forming a shroud frame as a one-piece hook and rail assembly which includes a first rail and a second rail, the first rail and second rails extending in an axial direction and a first L-shaped support and a second L-shaped support extending between the first rail and the second rail in a circumferential direction such that the first and second L-shaped supports each have a portion that extends forward, the first and second rails and the first and second supports being cast and integrally formed with one another and defining a central aperture therebetween;

joining a first portion of a backsheet to a lower surface of the shroud frame covering the central aperture, first and second rails extending aft with a second portion of the backsheet such that the second portion of the backsheet is angled relative to the first portion of the backsheet;

attaching a honeycomb rub strip to a lower surface of the backsheet; and forming a spline along an outer surface of each of the first rail and the second rail; further comprising forming a second spline disposed on the rails, aft of the second support.

10. The method of claim 6, further comprising the step of inserting a spline seal in the spline to inhibit radial air leakage between adjacent assemblies.

* * * * *